Dec. 21, 1954 H. W. PROTZELLER 2,697,290
ADJUSTABLE DEFLECTOR ARRANGEMENT FOR BALLAST EXCAVATORS
Filed Nov. 21, 1947 10 Sheets-Sheet 6

Inventor
Harry W. Protzeller
by Parker & Carter
Attorneys

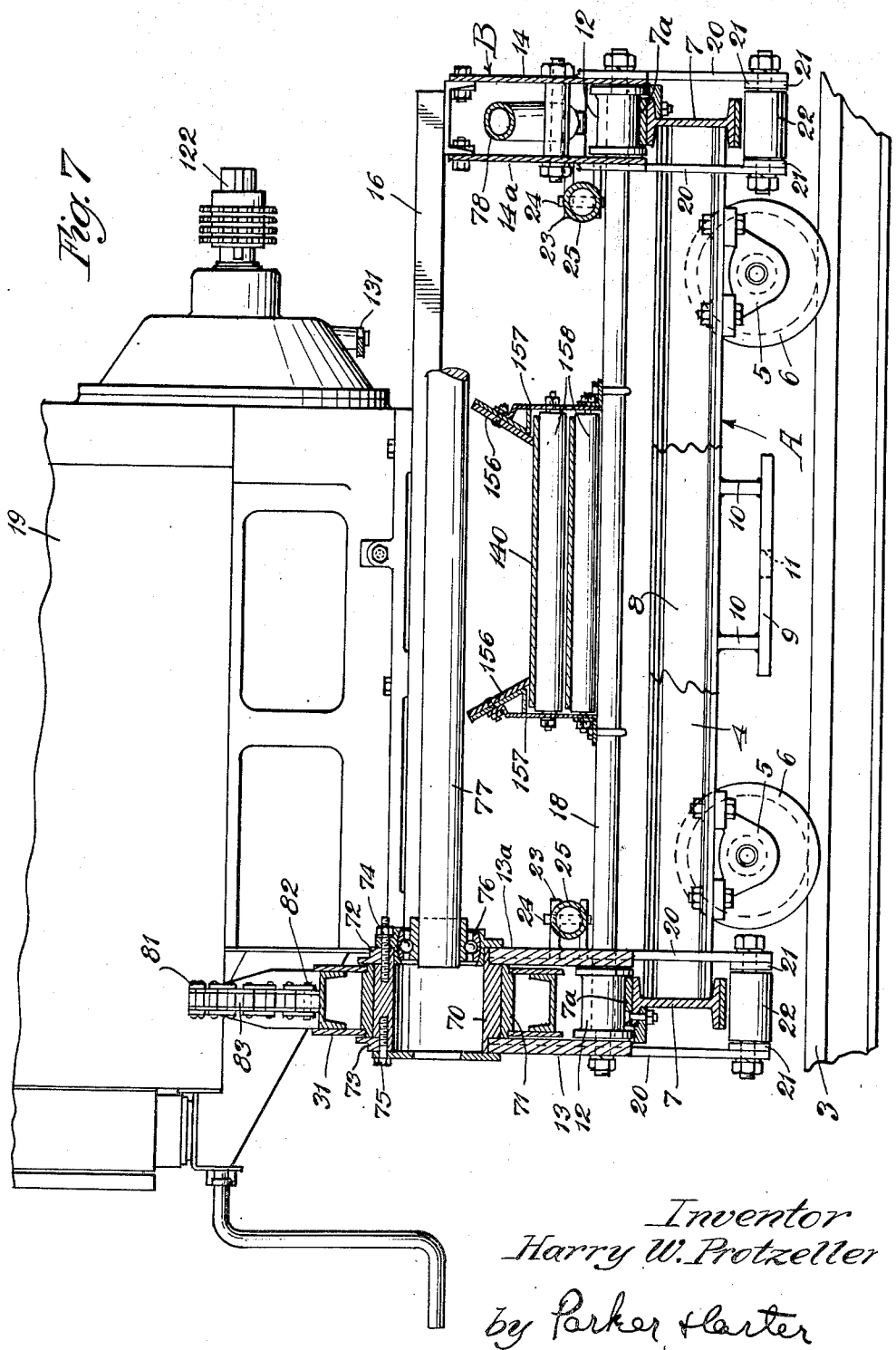

Dec. 21, 1954     H. W. PROTZELLER     2,697,290
ADJUSTABLE DEFLECTOR ARRANGEMENT FOR BALLAST EXCAVATORS
Filed Nov. 21, 1947     10 Sheets-Sheet 8
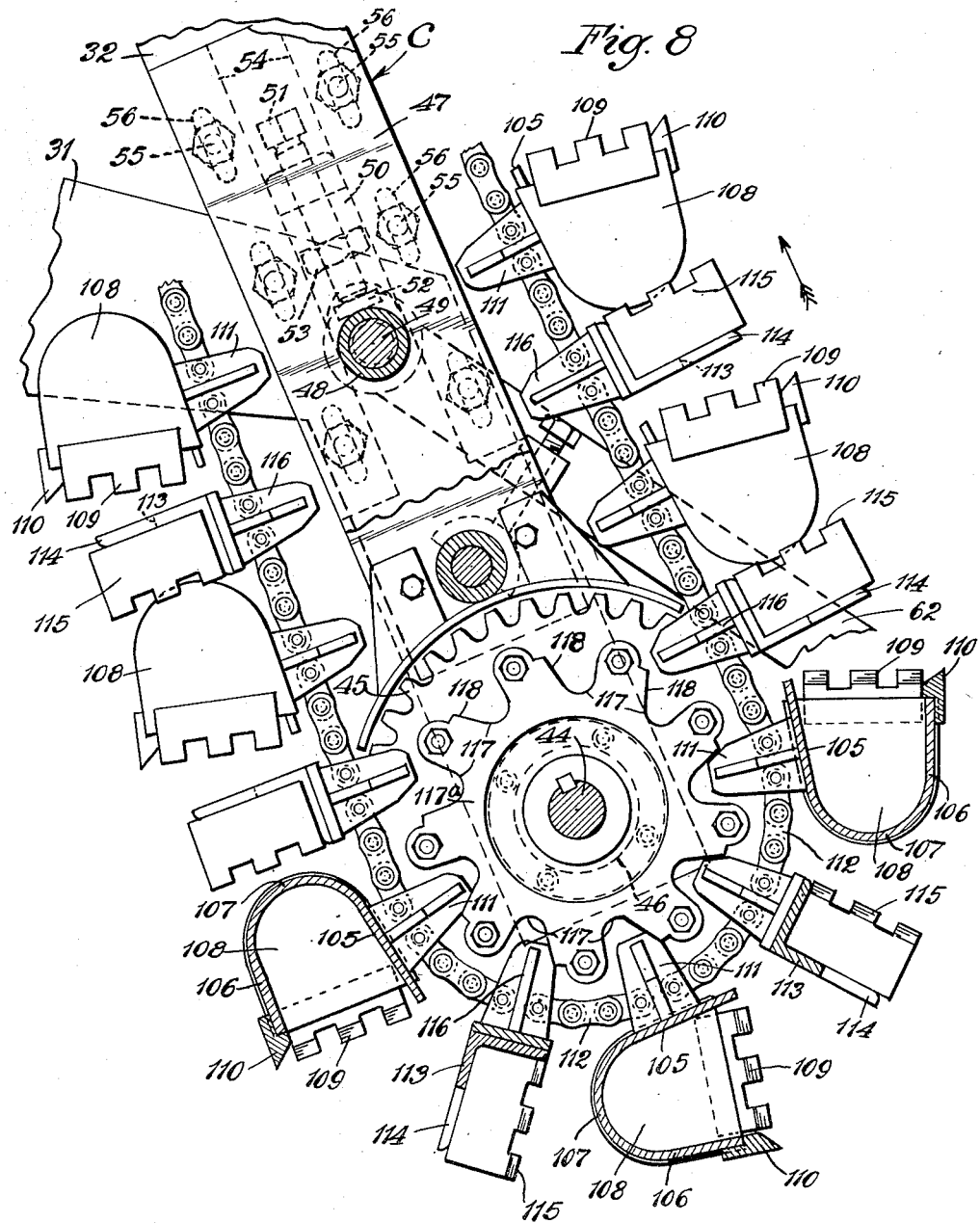
Inventor
Harry W. Protzeller
by Parker & Carter
Attorneys.

Dec. 21, 1954   H. W. PROTZELLER   2,697,290
ADJUSTABLE DEFLECTOR ARRANGEMENT FOR BALLAST EXCAVATORS
Filed Nov. 21, 1947   10 Sheets-Sheet 9
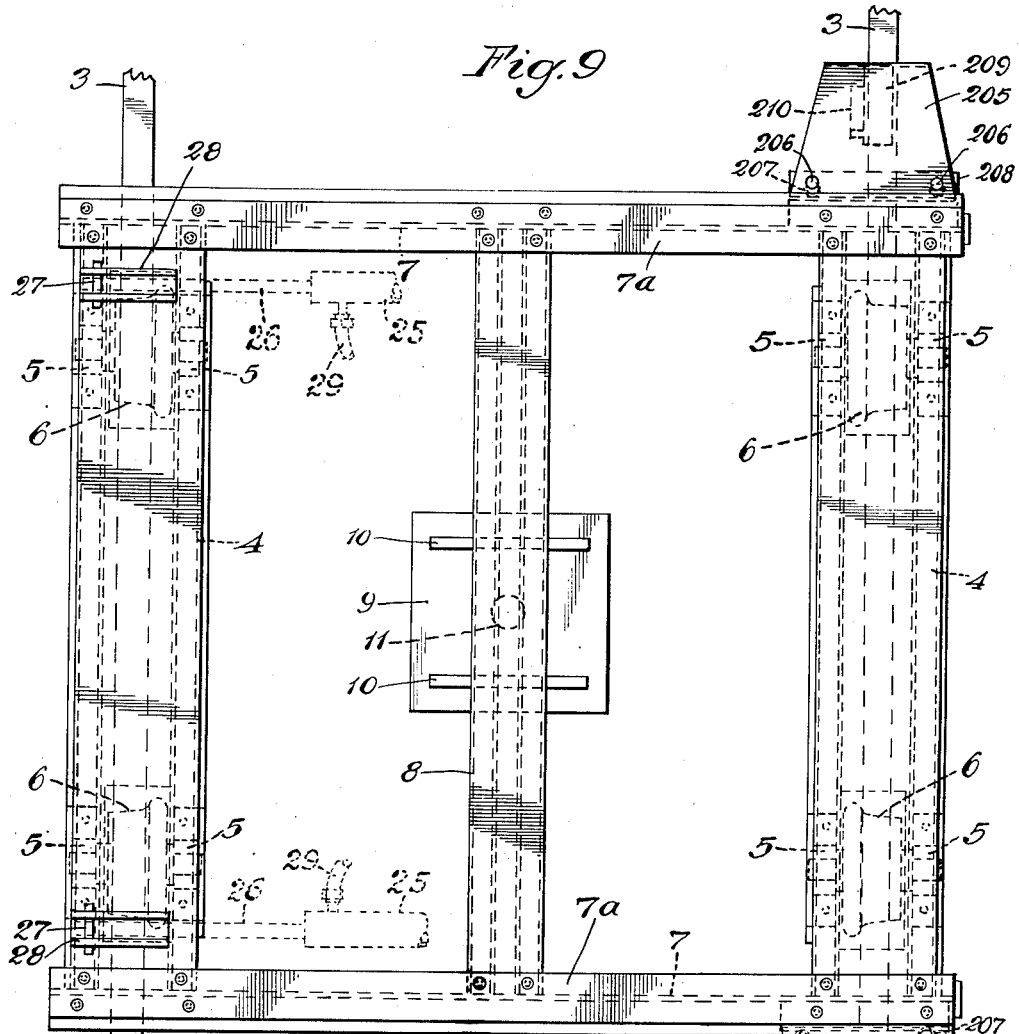
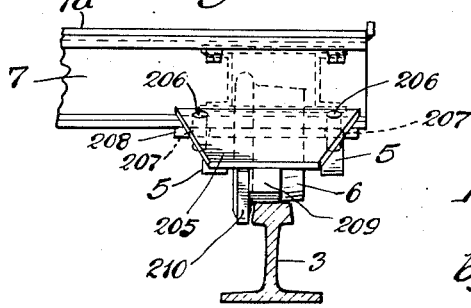
Inventor
Harry W. Protzeller
by Parker & Carter
Attorneys Dec. 21, 1954  H. W. PROTZELLER  2,697,290
ADJUSTABLE DEFLECTOR ARRANGEMENT FOR BALLAST EXCAVATORS
Filed Nov. 21, 1947  10 Sheets-Sheet 10
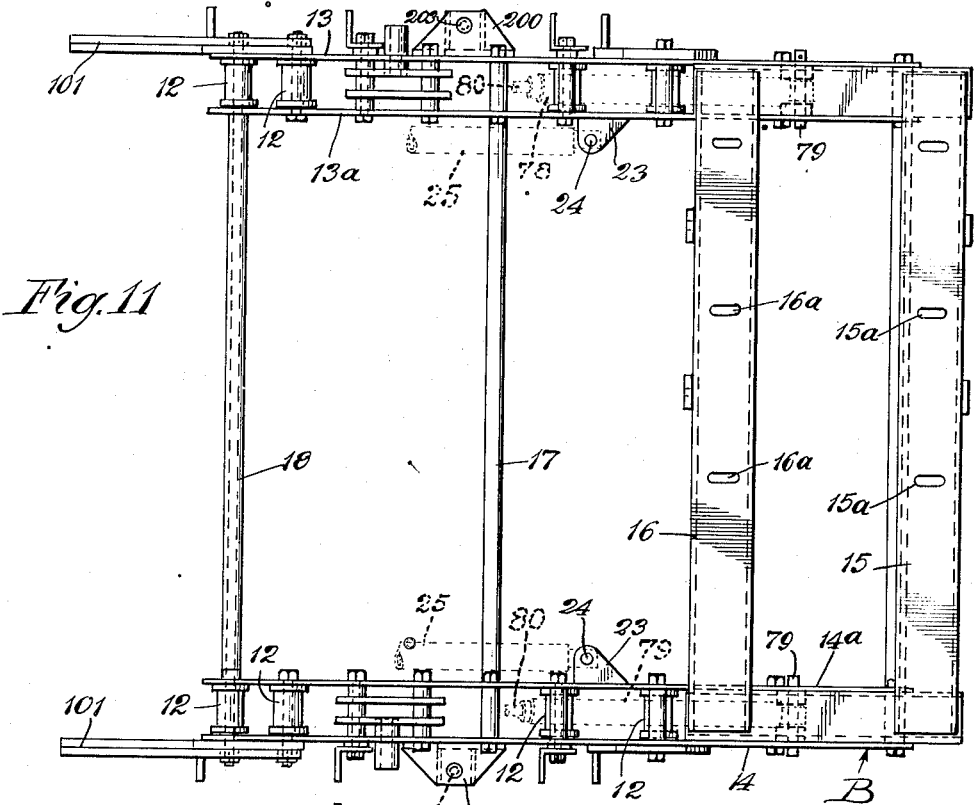
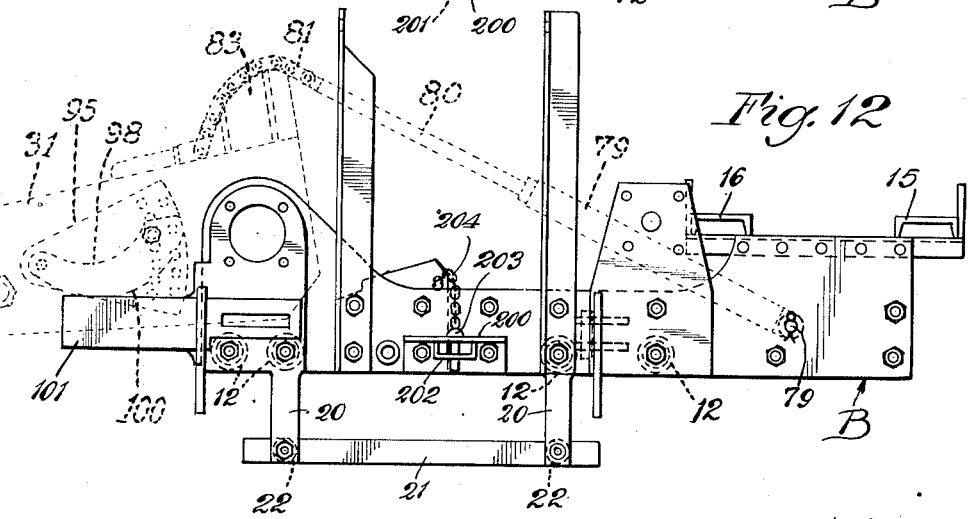
Inventor
Harry W. Protzeller
by Parker & Carter
Attorneys

United States Patent Office 2,697,290
Patented Dec. 21, 1954

2,697,290

ADJUSTABLE DEFLECTOR ARRANGEMENT FOR BALLAST EXCAVATORS

Harry W. Protzeller, Milwaukee, Wis., assignor to Nordberg Manufacturing Company, Milwaukee, Wis., a corporation of Wisconsin Application November 21, 1947, Serial No. 787,318

3 Claims. (Cl. 37—105)

My invention relates to an improvement in excavating devices, and has for one purpose to provide a device for excavating ballast.

Another purpose is to provide an excavator adapted to excavate and remove ballast from the right-of-way area outwardly beyond the ends of railway ties.

Another purpose is to provide improved means for breaking up ballast to facilitate its excavation from the track area beyond the tie ends.

Another purpose is to provide a ballast excavating structure applicable for use with ballast cleaning equipment.

Another purpose is to provide a ballast excavator which is readily movable along the rails of the track.

Another purpose is to provide a ballast excavator of such a weight that it may be readily removed from the rails of the track to permit the passage of trains and other equipment.

Another purpose is to provide means for moving the ballast excavator along the rails during its use.

Another purpose is to provide an improved excavating chain for a ballast excavator.

Another purpose is to provide improved excavating elements for a ballast excavator.

Other purposes will appear from time to time in the course of the specification and claims.

I illustrate my invention more or less diagrammatically in the accompanying drawings wherein:

Figure 7 is a section, with parts omitted, on an enlarged scale, on the line 7—7 of Figure 2;

Figure 8 is a partial section, on an enlarged scale, on the line 8—8 of Figure 4;

Figure 9 is a plan view of the base member;

Figure 10 is a section on the line 10—10 of Figure 9;

Figure 11 is a plan view of a portion of the intermediate frame; and

Figure 12 is a side elevation of the structure shown in Figure 11.

Like parts are indicated by like symbols throughout the specification and drawings.

Figure 1:
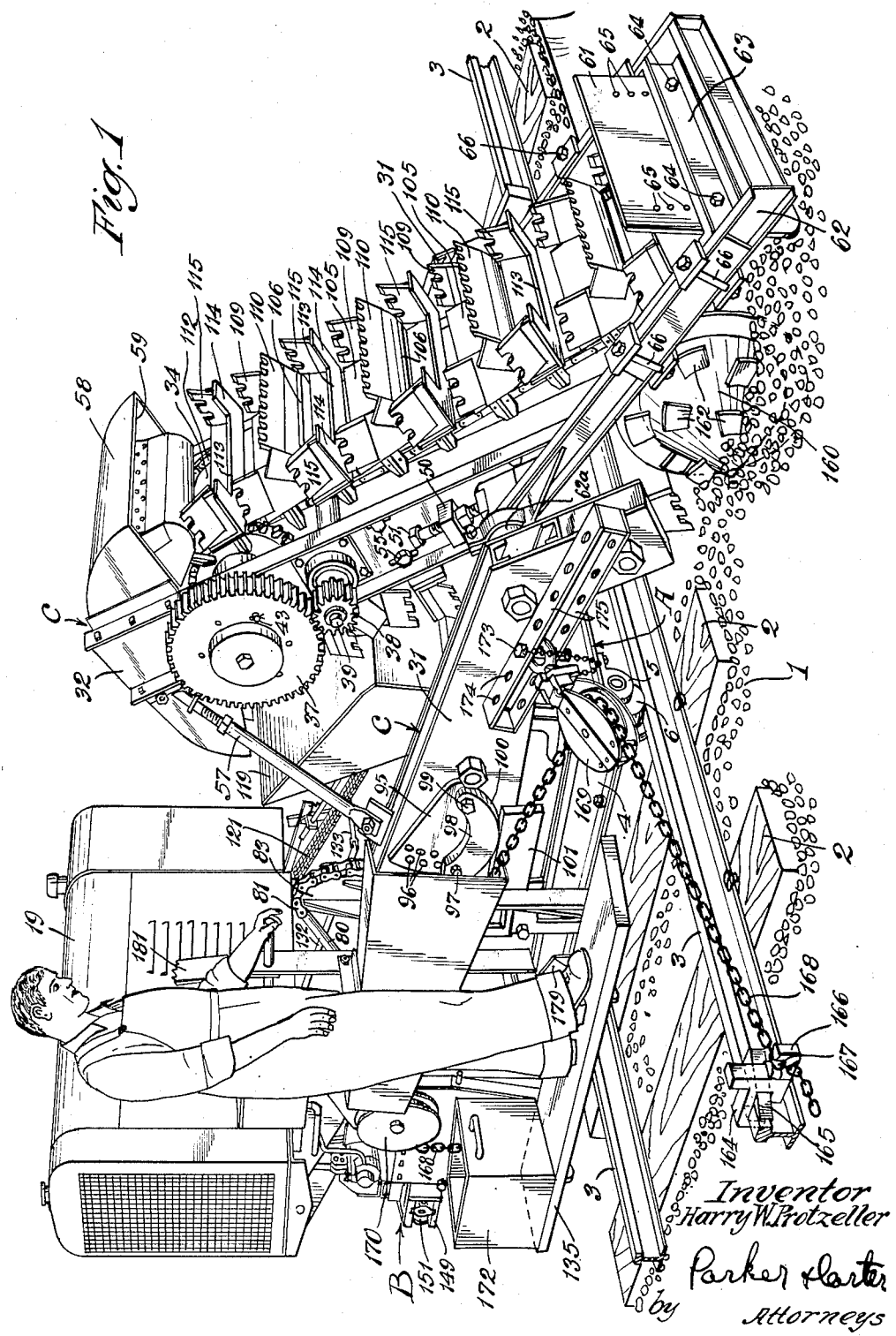
Figure 1 is a perspective view of an embodiment of my invention in operative position.

Referring to the drawings, 1 generally indicates the ballasted portion of a railroad right-of-way. Railroad ties are indicated at 2, and track rails at 3.

Riding on the rails is a base section, shown in plan view in Figure 9, and clearly shown in Figure 7. This base frame includes side frame members 4 provided with suitable bearings 5 to receive flanged rail engaging wheels 6. The wheels 6 may be provided with suitable insulation, not herein shown, to prevent electric transmission from the rails to the base of the structure, thus preventing interference with the signal system.

The side frame members 4 are connected by transverse or end frame elements 7 which may be constituted by I-beams or other suitable members. The I-beams 7 may be connected by an intermediate support or frame element 8, shown as parallel with the longitudinally extending side frame members 4. Secured to it is any suitable abutment plate 9, the purpose of which will later appear. It may be supported, for example, on spacing and supporting members 10, and may be provided with any suitable central aperture or depression 11. It will be understood that the above described base frame constitutes a base or supporting element which may be moved along the rails of a track during the operation of the device, and for the movement of the device to and from the place of operation.

Positioned on the above described base frame, which may be generally indicated by the letter A, is an intermediate frame, which may be generally indicated by B. The intermediate frame B may be moved transversely along the tracks 7 of the main frame A, which tracks may be constituted by I-beams, as shown in Figure 7, the upper flanges of the I-beams being adapted to receive any suitable rollers 12 of the intermediate frame B, which ride on any suitable supplemental or track strips 7a. The subframe B itself is constituted of side frame elements 13, 13a and 14, 14a, which are arranged in pairs, and which are connected by any suitable transversely extending frame elements 15, 16, 17 and 18, which extend longitudinally along the track.

The members 15 and 16 are formed to receive the motor structure which includes the motor itself, 19, and any suitable supporting means therefor, the details of which do not form part of the present invention. It will be understood that the motor assembly may be adjustably secured on the supports 15 and 16, which are provided with slots 15a and 16a, adapted to receive any suitable securing bolts.

Supported on the end plates 13, 13a and 14, 14a are any suitable hangers or depending members 20 which are tied together by cross-bars 21, and which carry any suitable rollers 22, as shown in Figure 7, which rollers underlie the lower flanges of the I-beams or tracks 7 of the base frame. Thus a practical means is provided for preventing rotation of the intermediate frame out of position.

The intermediate frame B may be traversed across the base frame A, along the tracks 7, by any suitable means. I illustrate, for example, lugs 23, best shown in Figs. 5, 7 and 11, which are attached in any suitable manner to the subframe B and to which are pivoted, as at 24, cylinders 25 which receive any suitable piston rods 26, illustrated in Figure 5, which rods are pivoted, as at 27, to lugs or ears 28, shown on the main frame, as in Figure 9. Thus, a fluid, under compression, is delivered along the lines 29 to the cylinders 25 at opposite sides of the piston. Depending upon which side of the piston receives the pressure, the sub-frame B may be traversed on the main frame. It will be understood that any suitable control means may be used, such as the control valve element 30, and it will be further understood that any other suitable means may be used for traversing the subframe B.

The excavating boom proper, which may be generally indicated at C, is rotatably mounted on the sub-frame B. The boom structure includes a pair of arms, generally indicated as 31. Each arm may be built up of a plurality of individual plates, channels and the like, which need not be described in detail, it being understood that an arm of suitable strength is provided. Secured to the end of the arms is the boom structure proper, which will later be described.

Figure 4:
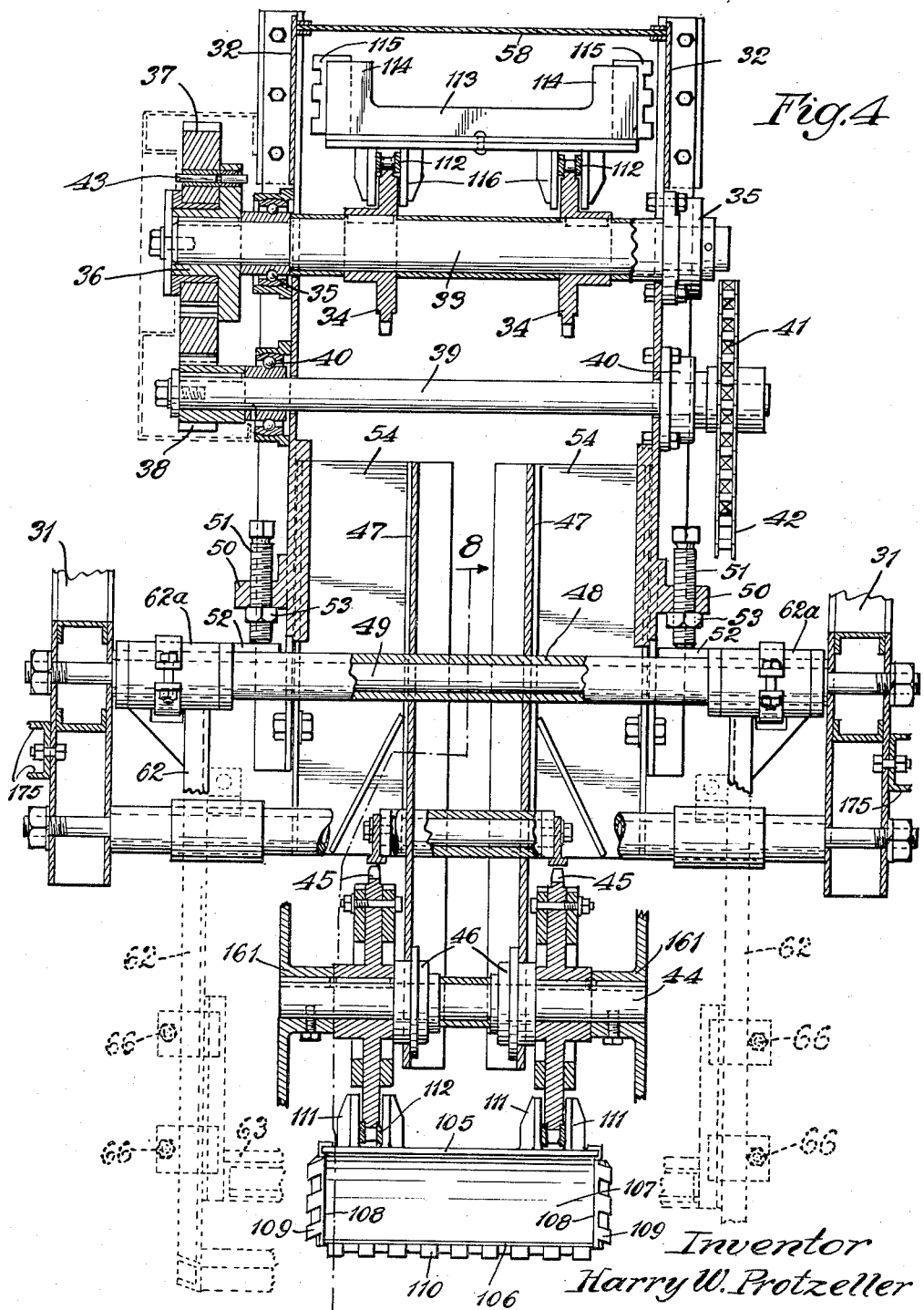
Figure 4 is a section, on an enlarged scale, on the line 4—4 of Figure 2.

The boom structure proper may include side plates 32 which receive the bearing assemblies for the below described excavating belt. Referring, for example, to Figure 4, a top shaft 33 carries sprockets 34 and is received in suitable bearing assemblies 35 which are mounted in a suitable manner on the side plates 32, see Fig. 4 for example. The shaft 33 is driven through a hub 36 secured to the shaft, to which is secured a gear 37 in mesh with a pinion 38 on a shaft 39 in bearings 40, the shaft 39 carrying a sprocket 41 which is driven by any suitable chain 42. 43 indicates a shear pin which serves as a driving connection and normally holds the gear 37 against movement in relation to the shaft 33, which permits its release due to overload.

A lower sprocket shaft 44 carries idler sprockets 45 and rotates in any suitable bearings 46 in an intermediate frame 47 suitably supported in or forming part of the boom structure. The members 47 are adjustable in relation to the rest of the boom structure, and are solidary with a hollow tube 48 supported on a shaft 49 secured to the arms 31.

In order to permit adjustment of, or suitable take-up of, the below described sprocket chain, I provide lugs 50 secured to or held against movement in relation to the side plates 32, which receive screw-threaded locking pins 51, the lower ends of which bear against abutment portions 52 on the sleeves 48. 53 indicates any suitable lock nuts which may be tightened after the adjustment is made.

Any suitable spacing means may be employed between the members 47 and 32. I illustrate, for example, flanged spacing plates 54 provided as at 55 with bolts which pass through slots 56 in the side plates 32. The boom C is additionally supported on the arms 31 by any suitable tie rods 57. The upper end of the boom may carry any suitable deflector structure or housing 58 having a forward edge 59 and a rear edge 60. A bottom deflector plate 61 may be suitably mounted on any suitable forward frame projection 62 which may be secured at its inner end to the sleeve structure 62a on the sleeve 48. It will be noted that the members 62 adjustably receive a cross-frame 63 in which the deflector 61 is adjustably mounted, as by bolts 64 and bolt-receiving apertures 65. The cross-frame is shown as in the shape of a U, and may be locked in position by any suitable locking bolts 66.

The boom structure C, above described, is rotatably mounted on the sub-frame B for rotation between excavating and inoperative position. It is shown in the excavating position in Figures 1 and 2, and in the elevated or inoperative position in Figure 3.

Any suitable pivot structure may be employed, but I illustrate fixed sleeves 70, of which there is one at each side of the boom structure, one for each of the arms 31. However, in Figure 7, one side is omitted. The fixed sleeve 70 receives a surrounding bearing sleeve 71, each one of which is secured to or forms part of one of the arms 31. The rotating sleeves 71 are shown as held in position on the fixed sleeve 70 by any suitable side abutment rings 72, 73, which may be held in position, for example, by bolts 74, 75. The bolts 74, as will be clear in Figure 7, also position the bearing assemblies 76 for the shaft 77, the purpose of which will later appear.

In order to rotate the boom about its axis, I illustrate the following structure. Cylinders 78 are pivoted, as at 79, to the sub-frame B. They receive pistons having the outwardly projecting piston rods 80. Each rod has secured to its outer end a flexible member, such as the chain 81, which is dead-ended as at 82 on an abutment 82a on the arm 31, and which passes about a curved bearing member 83 which forms part of, or moves with, the arm 31. It will be understood that the above structure may be in duplicate, identical for each of the arms 31.

Figure 3:
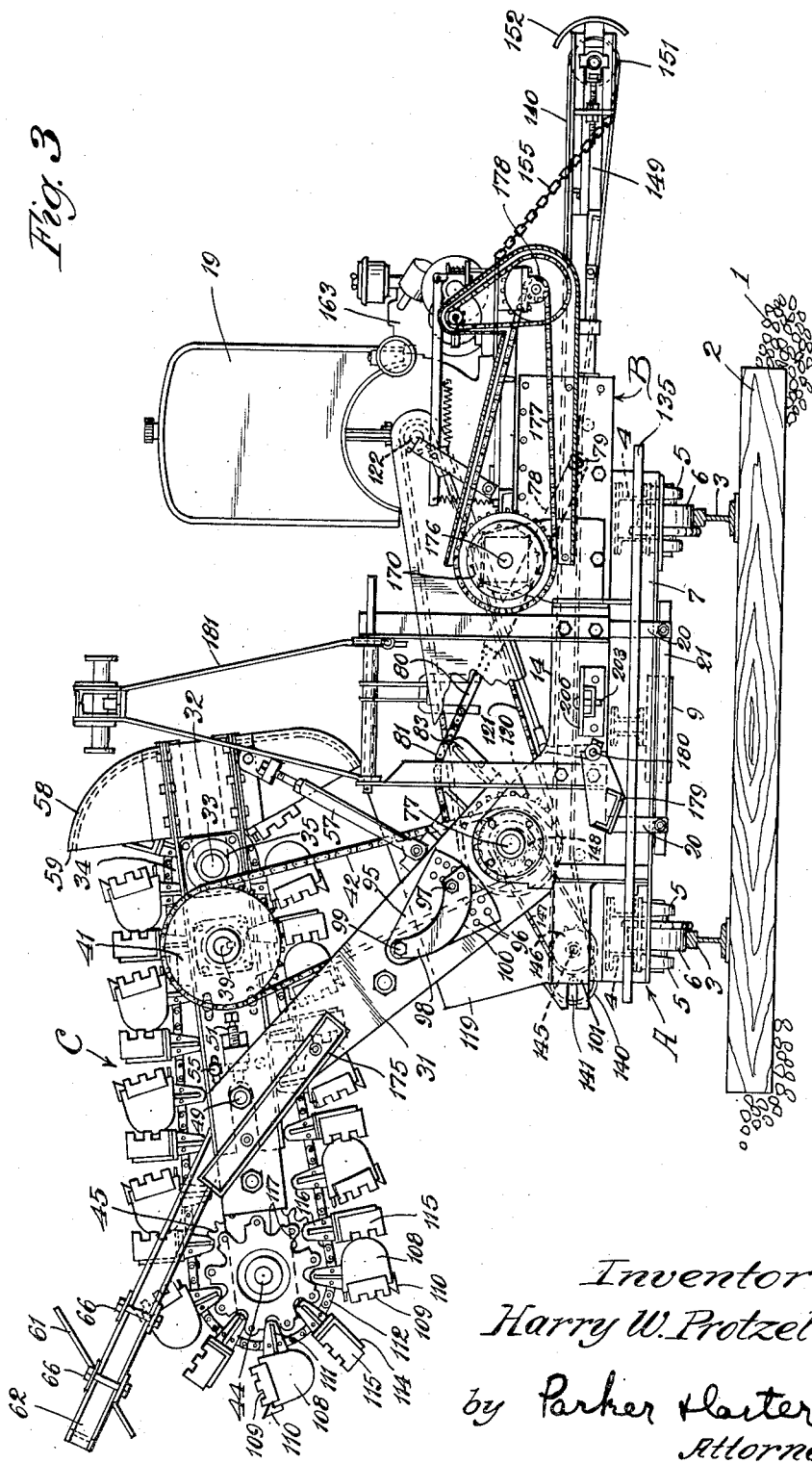
Figure 3 is an end elevation of the opposite end of the device, with the excavating boom elevated.

Any suitable hydraulic or pneumatic control system may be employed, including the fluid line 90, which admits the pressure necessary to withdraw the pistons 80 inwardly, with the result of rotating the boom C to the elevated position in which it is shown in Figure 3. While any suitable control means may be employed, I illustrate a control element 91. Whereas I illustrate a structure in which the boom is allowed to return by gravity to its lowered position, any other suitable raising, lowering, and control means may be employed.

The downward limit of movement of the arms 31 and those of the boom structure C may be controlled and varied as follows: I illustrate an adjusting segment 95 provided with a plurality of apertures 96 to receive an adjusting bolt or bolts 97 on the adjustable abutment member 98, which is shown as pivoted, for adjustment, as at 99, and as provided with a bottom arcuate edge 100 adapted to abut against any suitable supporting element 101 on the sub-frame B. Thus the limit of downward movement of the boom C may be varied, and, thus, the cutting level of the below described buckets.

Passing about the sprockets 34 and 45, I illustrate a cutting and excavating chain which is formed to include a plurality of buckets, each pair of buckets being separated by a side cutting or excavating member.

I illustrate, for example, in Figures 4 and 8, a plurality of buckets, each of which has an inner wall 105, an outer wall 106, a bottom 107, and end walls 108. Along the end walls I provide removable, toothed cutting plates 109, and along the edge of the front wall 106 I illustrate removable, toothed cutting plates 110. It will be understood that these may be removable or not, as desired, but it may be frequently advantageous to make them removable. In any event, each bucket has a forward cutting member 110 and side cutting members 109. Each bucket has at each end an inwardly projecting knock-out, shaker lug 111, and is suitably secured in, and forms part of, a chain, which may include intermediate chain link elements 112.

In the form of chain herein shown, as in Figure 8, between each pair of buckets, I illustrate a side excavator having a transverse structure 113, shown as a bar having end enlargements 114 which receive, preferably removably, toothed side cutting elements 115. These cutting elements are separated by a distance somewhat greater than the distance which separates the side cutting elements 109 of the buckets. Therefore, the intermdiate cutters cut a somewhat wider bite than is actually cut or picked up by the buckets. The side cutting elements are also provided with shaker or knock-out lugs 116. It will be understod that the knock-out lugs 111 and 116 enter notches 117 in a plate member 117a attached in any suitable manner to the sprockets 45, the opposed parts of the knock-out members and notches being so formed as to cause sharp movement of the buckets and of the side cutting members as they pass about and escape from the sprockets.

Whereas any suitable contouring of the opposed parts may be employed, I find that the contouring shown in Figure 8 is highly advantageous, in that opposed surfaces of the lugs 111 or 116, and the portion 118 of the plate member 117a cause a definite snap action or sharp movement of the lugs in the course of the normal movement of the chain about the sprocket.

Figure 2:
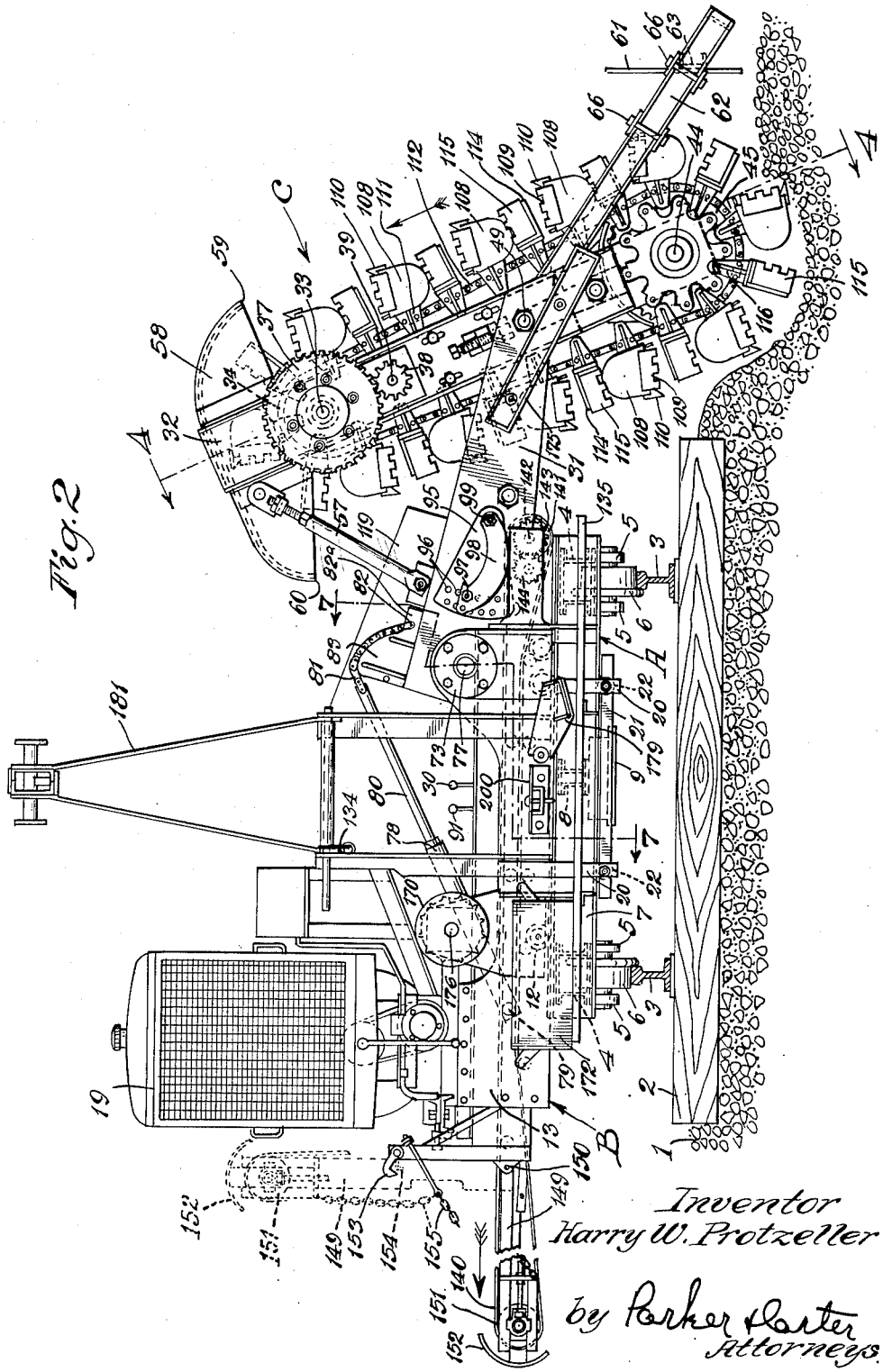
Figure 2 is an end elevation illustrating the device in operative position.

The chain is driven in the direction of the arrow of Figure 8, and, in operation, when the parts are in the position shown in Figure 2, the excavated material may be thrown outwardly from the track. The deflector shield 61 receives the projected material, but the buckets are substantially fully loaded and carry their load upwardly under the shield 58, to be dumped downwardly from the upper end of the boom into any suitable hopper 119, suitably supported on the intermediate frame B.

Figure 5:
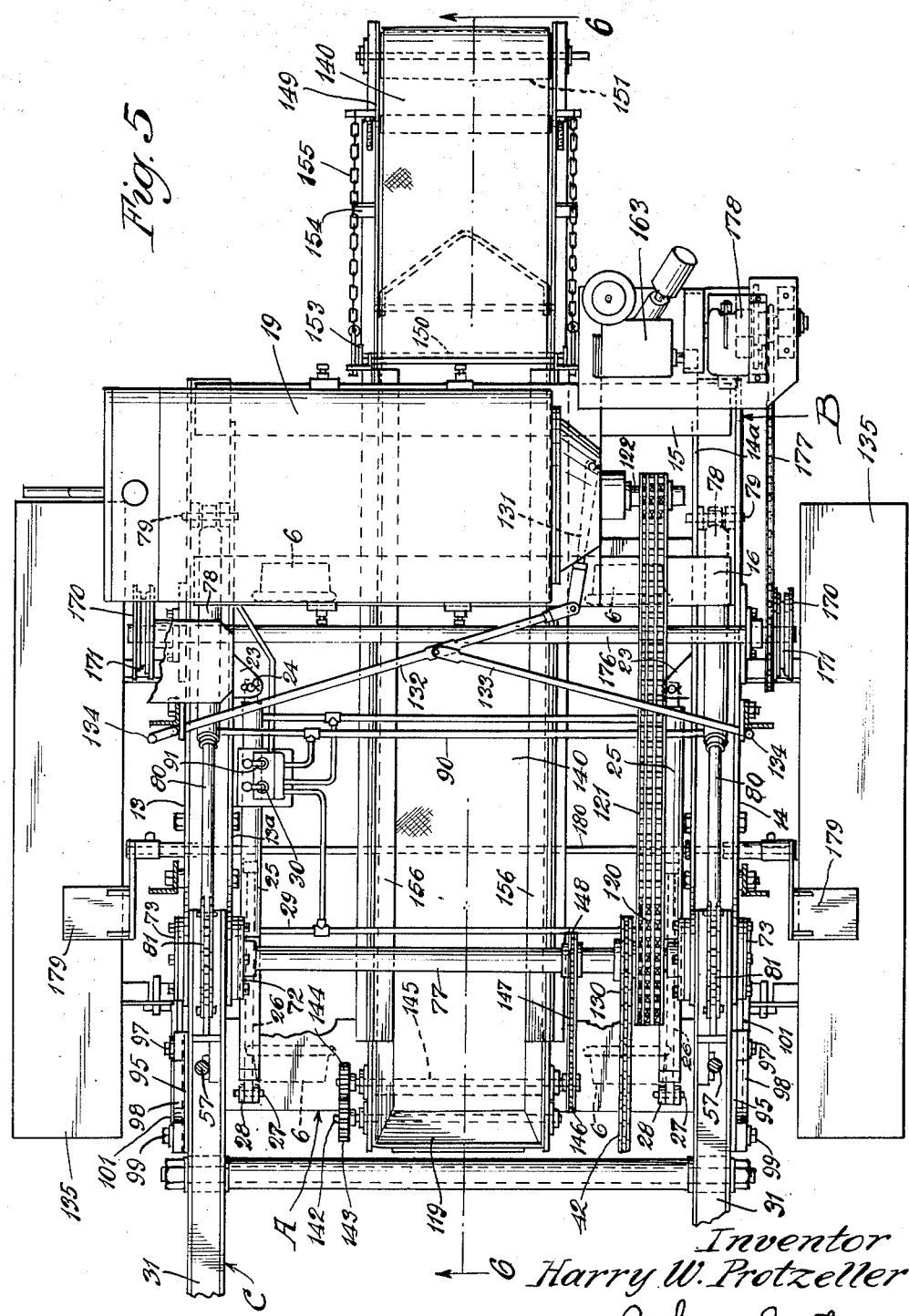
Figure 5 is a partial plan view, with parts broken away.
Figure 6:
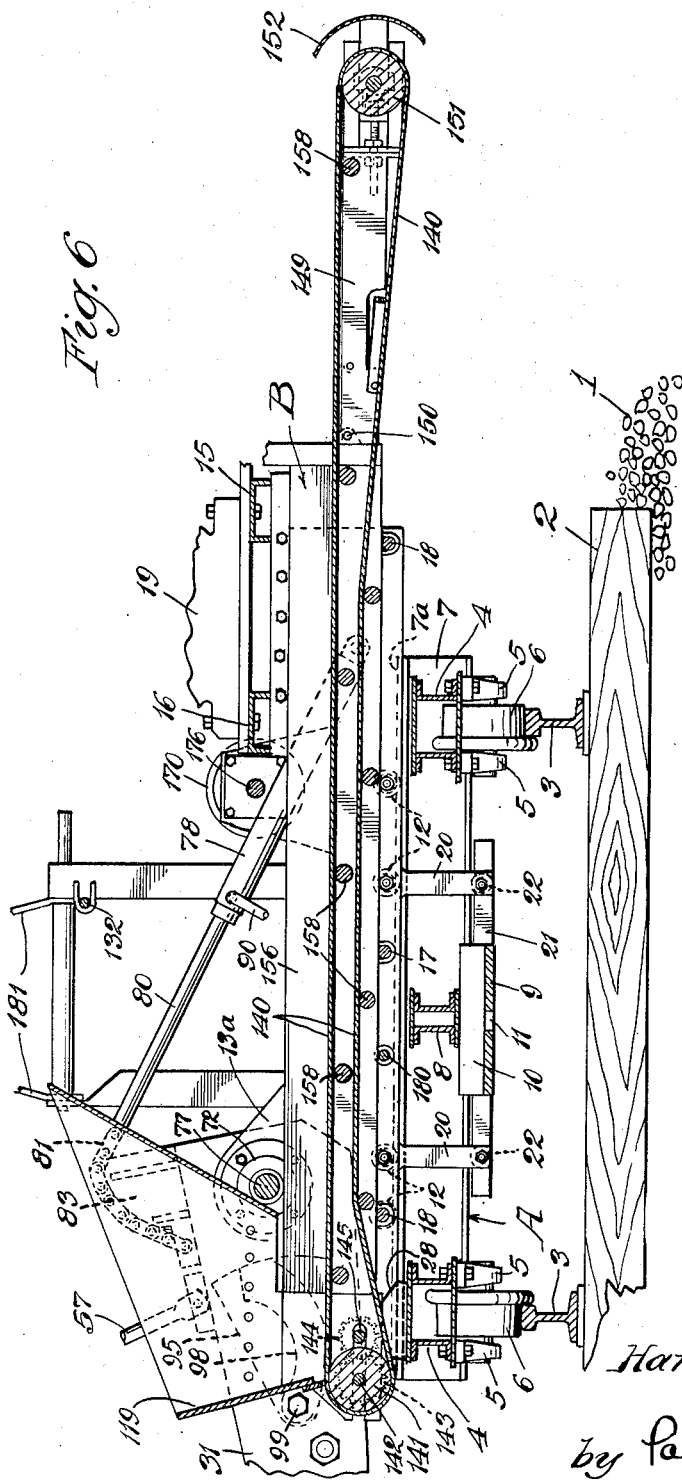
Figure 6 is a section on the line 6—6 of Figure 5.

The chain may be driven as follows: The shaft 77, with its sprockets 120, shown, for example, in Figures 5 and 7, is driven by suitable chains or driving members 121 from the drive shaft 122 of motor 19. The shaft 77, in turn, carries a driving sprocket 130 which is connected by a driving chain 42 which passes about the sprocket 41 of the shaft 39, as shown in Figures 3 and 4. Thus, through the gear reduction shown in Figure 3, and earlier described, the excavator chain of the boom C is driven. Any suitable clutch structure may be employed, the details of which do not, of themselves, form part of the present invention. I illustrate, for example, a clutch lever 131 and an actuating lever 132, with a supplemental actuating lever 133 pivoted to it, there being handles 134 at each side of the sub-frame B, whereby it may be operated from either side by an operator standing on a supporting platform 135 suitably supported on the sub-frame B.

In order to remove the excavated material and to deliver it to any desired point or to any desired supplemental or associated equipment, I illustrate an endless conveyor 140 driven by a drive pulley 141 on the shaft 142 carrying a gear 143 meshing with the drive pinion 144 on a shaft 145. The shaft 145 is, in turn, driven through the sprocket 146, and the chain 147, from the sprocket 148 on the shaft 77, as will be clear from Figure 5. Any suitable intermediate supporting or guiding rollers or pulleys may be provided for the conveyor 140, but I illustrate also a foldable end section, shown, for example, in Figure 2. A pivoted supporting frame 149, pivoted as at 150, carries an end pulley 151 with its end guard or deflector 152.

When the device is in operation, the parts may be in the full-line position of Figure 2. If desired, however, the end section of the conveyor may be rotated upwardly into the inoperative and laterally withdrawn dotted-line position of Figure 2. In that event, any suitable latch 153 may engage a cross-piece 154 and hold the end section of the conveyor upwardly withdrawn. 155 is any suitable flexible support for the pivoted end portion of the conveyor frame.

As will be clear from Figure 7, the conveyor 140 and its supporting structure rest upon the transversely extending rods or frame elements 17 and 18. Lateral escape of material from the conveyor 140 may be prevented by the apron walls 156, the lower edges of which closely approach the upper surface of the belt 140. Any suitable supporting structure 157 may be employed in which the transverse supporting rollers 158 may also be rotatably mounted.

It will be understood that the above described structure stops short of a folding and outwardly projecting end section of the conveyor.

I may find it desirable to employ means for breaking up the ballast in the area of excavation. I may employ, for example, at each side of the lower end of the boom, and in connection with the shaft 44, a rotary breaker. I illustrate one such in Figure 1, but I have omitted the breaker from the remaining views. Any suitable breaker may be employed, but I illustrate a cone 160, of which one may be mounted on each end of the shaft 44, such a connection being illustrated at 161 in Figure 4. The cone 160, in Figure 1, is shown as carrying a plurality of inclined agitating or material-engaging blades 162. It will be understood that the cone rotates counterclockwise, referring to the position of the parts as shown in Figure 1, since the lower length of the bucket chain moves down and the upper or outer length moves up. The result is that the material is broken up and pushed away from the area of excavation, and the task of excavating and removing the ballast is made easier. Since the device may be moved in either direction, it is advantageous to have one of these rotating breaker members mounted at each side of the boom.

Whereas I do not wish to be limited to any specific way of moving the device along the track, a convenient method of operating is to fix an abutment member on the rail and employ a flexible member, one end of which is secured to the abutment member and the other end of which is reeled in by the power of the supplemental motor 163.

For abutment I illustrate a yoke 164 which may surround the upper part of a rail, and a wedge 165 to secure it in position. 166 is an outwardly extending portion provided with a chain-receiving notch 167. 168 indicates a chain which passes through the pulley 169 and passes about a drum 170 driven by the motor 163. The drum is provided with a circumferential slot, as shown at 171, appropriately formed to grip the chain and to reel it in or bail it out when the motor is rotated in the proper direction. The loose end of the chain may be received in a box 172 when the chain is being reeled in. The result is to wind up the chain and to pull the device along the rails. The pulley 169 is shown as mounted on an adjustable bolt or pin 173 which may be dropped into any one of a number of apertures 174 which are vertically aligned in the upper and lower abutment plates 175 secured to one of the arms 31. If desired, a channel may be used for this purpose.

It will be understood that the above described structure may be duplicated at each side of the device. The drums 170 are shown as mounted on a single shaft 176, which rotates in any suitable bearings on the sub-frame B. The shaft is driven from the motor 163 by any suitable drive 177. 178 indicates any suitable gear reduction. Any suitable clutch means may be employed to connect and disconnect the motor 163 from the drive mechanism which may, for example, be controlled by a foot pedal 179, of which there is one at each side of the device, adjacent to and usable from one of the platforms 135.

In Figure 1, the operator is shown with his foot on one of the pedals 179. Any suitable intermediate connection may be employed, including, for example, the rod 180. The details of the connection, since they do not, of themselves, form part of the invention, will not be further described.

If it is desired to remove the device from the track, the bottom plate 9 may be employed, in connection with any suitable jack or turntable structure, not herein shown in detail. I also provide a lifting bail, indicated generally at 181, which is available if a derrick or similar equipment is used, to lift the entire device bodily from the tracks. It will also be understood that, if desired, the device may be pulled by an engine trailer or tractor, or the like. I illustrate, for example, flanges or ears 200 at the opposite sides of the sub-frame B, each such member being apertured at 201, and provided with a lower loop 202, similar apertured. 203 is any suitable securing pin, flexibly connected to the sub-frame B, as by the chain 204.

It will be realized that, whereas, I have described and illustrated a practical and operative device, nevertheless many changes may be made in the size, shape, number and disposition of parts without departing from the spirit of my invention. I therefore wish my description and drawings to be taken as in a broad sense illustrative or diagrammatic, rather than as limiting me to my precise showing.

The use and operation of the invention are as follows:
The above described excavator may advantageously be used in connection with excavating the ballast along the edges of the track space or between adjacent tracks. Its area of excavation is limited by the necessity of avoiding the ends of the ties, but, by traversing the sub-frame B on the main frame A, an area of substantial width may be excavated along a track or between two tracks. It will be understood, of course, that it is necessary to use other equipment or other means to excavate the ballast in the cribs between the rails.

In the normal operation of the device the supplemental motor 163 is used to reel in on the chain 168 and to pull the excavator along the rails. The boom is depressed to proper position, its downward position being limited by the setting of the adjustable member 98 which engages the abutment block 101. Thus the downward rotation of the arms 31 in relation to the sub-frame B is limited, and the depth of penetration of the chain is controlled.

When the boom is at the proper position, and the chain is being driven, the lower or inner stretch of the chain moves downwardly, and the lateral cutter blades cut into the ballast and break and loosen it up for the individual buckets. Each of the buckets may have front and end cutters, as shown at 109 and 110, and quickly and efficiently digs up and removes the material. The breaker member 160 is also useful at loosening the ballast, in advance of the chain, and scooping up material and delivering it to the far side of the following bucket, as the device is drawn along the rails by the chain 168. The excavated material is dropped upon the conveyor 140 and may be delivered for disposal, cleaning, screening, or storage, depending upon the problem involved and the desire of the operator.

In order to resist the torsion stresses caused by the operation of the device when excavating, I find it advantageous to employ rail engaging members on the side of the main frame above the rail and adjacent the actual excavating area. I illustrate, for example, plates 205 which may be removably secured by pins 206 passing through appropriate apertures 207 in the plate 208 which is secured to or forms part of the main frame. The centering or torsion resisting plate 205 has a block 209 which rests on the top of the rail 3 and a side block 210 which is longer than the wheel flange, and which is adapted to engage the side of the head or top flange of the rail 3. The extra downward extension of the side plate or block 210 prevents the escape of the flange supporting wheel 6 over the rail 3, in the event that there is a slight lifting of the main frame.

The side cutting elements 115, which I may properly call plows, are an important feature of the invention. The plows extend outwardly a somewhat greater distance than the adjacent side walls of the individual buckets, and they are somewhat inclined, and, therefore, as they cut into the material being excavated, they move material laterally into the following bucket. This is important, in filling the buckets substantially full, which would not be the case if a series of buckets were employed without intervening plows. This permits the employment of buckets of substantial width along the track axis. Also, the plows or side cutting elements on the advancing side, during movement of the device, break up the ballast or material.

I find it advantageous, in connection with the towing or reeling-in system, that the member 179 have the function of a "dead man" control; that is to say, I may provide any suitable connection in the drive, whereby, when the operator takes his foot from the member 179, the motor idles or the drive is interrupted. Since the details of this control do not, of themselves, form part of the present invention, they are not further indicated herein.

I claim:

1. In a ballast excavating and handling machine for use on a railroad track, a base mounted for movement along the rails of the track, an excavator boom mounted on the base adapted for movement into and out of excavating position with the boom transversely disposed and extending to one side of the rails, a plurality of sprockets on the boom mounted for rotation about parallel longitudinal axes, a chain structure disposed along the boom and over the sprockets, power means for moving the chain over the boom and sprockets so that when the boom is in excavating position, the chain will describe a transverse digging path extending below the ballast level at an area beyond the ends of the ties, a plurality of excavator buckets associated with various lengths of the chain having cutting edges on their end surfaces and side surfaces so that, when the base is moved along the rails with the excavator boom transversely disposed thereon in its excavating position the excavator buckets, in response to rotation of the sprockets, will move with the inner length of the chain moving downwardly and with the upper outer length of the chain moving upwardly, the buckets being downwardly open as they move downwardly and outwardly with the chain to pass about the lower end of the digging path about the bottom of the boom to thus engage, cut and excavate the ballast forming an approximately arcuately cross-sectioned trench beyond the ends of the ties transverse to the boom and the direction of movement of the chain, and a substantially U-shaped deflector frame mounted on the boom extending beyond its lateral extremity, a cross frame adjustably mounted on the deflector frame for sliding movement toward and away from the chain, and a deflector adjustably mounted on the cross frame in the line of outward delivery of ballast material by the buckets as they pass about the bottom of the boom and mounted for vertical adjustment with respect to the general plane of the ballast, said deflector being normally closely spaced with respect to the bottom sprocket and the path of movement of the buckets about it so as to deflect the ballast material back toward and into the path of the moving buckets so that the majority of the material being dislodged by the cutting edges on the buckets is picked up either by direct contact with the buckets during their movement about the bottom of the boom or by deflection back from the deflector means into the path of the moving buckets.

2. The structure of claim 1 wherein the boom is rotatably mounted on the base.

3. The structure of claim 1 characterized by and including auxiliary power means for moving the boom into and out of excavating position.

References Cited in the file of this patent
UNITED STATES PATENTS

| Number | Name | Date |
| --- | --- | --- |
| 471,920 | Warren | Mar. 29, 1892 |
| 796,747 | Marshall | Aug. 8, 1905 |
| 808,637 | Crossley | Jan. 2, 1906 |
| 996,653 | Lawson | July 4, 1911 |
| 1,132,338 | Haiss | Mar. 16, 1915 |
| 1,220,122 | Hewitt | Mar. 20, 1917 |
| 1,224,323 | Rice | May 1, 1917 |
| 1,234,764 | Hudson | July 31, 1917 |
| 1,290,871 | Bager | Jan. 14, 1919 |
| 1,316,074 | Bales | Sept. 16, 1919 |
| 1,329,523 | Hanson | Feb. 3, 1920 |
| 1,377,333 | French | May 10, 1921 |
| 1,398,195 | Liggett | Nov. 22, 1921 |
| 1,462,494 | Otto | July 24, 1923 |
| 1,471,760 | Ursino | Oct. 23, 1923 |
| 1,579,704 | Grow | Apr. 6, 1926 |
| 1,591,689 | Spears | July 6, 1926 |
| 1,764,949 | George | June 17, 1930 |
| 1,859,659 | Elliott | May 24, 1932 |
| 1,864,552 | Protzeller | June 28, 1932 |
| 1,912,743 | Vaughn | June 6, 1933 |
| 2,266,633 | Gill | Dec. 16, 1941 |
| 2,272,429 | Philbrick | Feb. 10, 1942 |
| 2,336,079 | Eustis et al. | Dec. 7, 1943 |
| 2,463,499 | Thornley | Mar. 1, 1949 |